United States Patent
Schmidt

(10) Patent No.: US 10,488,738 B2
(45) Date of Patent: Nov. 26, 2019

(54) TEMPERATURE MANAGEMENT OF A DRIVER ASSIST CAMERA VIA A VEHICLE WINDSHIELD

(71) Applicant: TRW AUTOMOTIVE US LLC, Livonia, MI (US)

(72) Inventor: Juergen Schmidt, Novi, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 132 days.

(21) Appl. No.: 15/453,070

(22) Filed: Mar. 8, 2017

(65) Prior Publication Data
US 2018/0259830 A1 Sep. 13, 2018

(51) Int. Cl.
*H04N 5/225* (2006.01)
*G03B 17/55* (2006.01)
*B60R 11/04* (2006.01)

(52) U.S. Cl.
CPC .............. *G03B 17/55* (2013.01); *B60R 11/04* (2013.01); *H04N 5/2252* (2013.01)

(58) Field of Classification Search
None
See application file for complete search history.

(56) References Cited

U.S. PATENT DOCUMENTS

| | | | |
|---|---|---|---|
| 8,339,453 B2 | 12/2012 | Blake, III et al. | |
| 9,635,229 B2 | 4/2017 | Wato | |
| 9,854,225 B2 | 12/2017 | Kimura et al. | |
| 2016/0006911 A1* | 1/2016 | Kimura | H04N 5/2252 348/47 |
| 2016/0344977 A1 | 11/2016 | Murao | |

* cited by examiner

*Primary Examiner* — Samira Monshi
(74) *Attorney, Agent, or Firm* — Tarolli, Sundheim, Covell & Tummino LLP

(57) ABSTRACT

An apparatus for moderating the environment of a driver assist camera comprises (a) a housing in which the driver assist camera is mountable and (b) a bracket configured and dimensioned to receive and retain the housing. The bracket when installed in a vehicle is attached to a window of the vehicle. A thermally conductive body is movably mounted on the bracket. The housing when being received in the bracket contacts and moves the thermally conductive body relative to the bracket so as to press the thermally conductive body against the window and permit heat from the housing to be conducted to the windshield, thereby moderating the environment of the driver assist camera when mounted in the housing.

7 Claims, 2 Drawing Sheets

TEMPERATURE MANAGEMENT OF A DRIVER ASSIST CAMERA VIA A VEHICLE WINDSHIELD

FIELD OF THE INVENTION

The present invention relates to an apparatus to help manage the temperature of an environment of a driver assist ("DAS") camera via a vehicle windshield.

BACKGROUND

DAS cameras are incorporated in a vehicle to acquire information and provide the acquired information to a vehicle safety system designed to assist the driver. A DAS camera may be mounted on or near the vehicle windshield to ensure a desired field of view. The DAS camera and its mounting system should be as small as possible to reduce interference with sight lines through the windshield. At the same time, multiple electronic components are mounted adjacent to the DAS camera to process the information acquired by the DAS camera and communicate the processed information via electronic signals to one or more other systems within the vehicle. As a result, the DAS camera and the associated electronic components will emanate substantial heat that requires dissipation to avoid thermal damage to the DAS camera and/or the adjacent or associated electronic components.

SUMMARY OF THE INVENTION

The present invention is directed to an apparatus to help manage the temperature of an environment of a DAS camera via a vehicle windshield and, more particularly, to an apparatus for modifying a temperature in an environment of a DAS camera via the vehicle windshield or windscreen.

In accordance with an example embodiment of the present invention, an apparatus for helping to manage a temperature of an environment of a driver assist camera of a vehicle comprises (a) a housing in which the driver assist camera is mountable and (b) a bracket configured and dimensioned to receive and retain the housing. The bracket is formed of a first material having a first thermal conductivity. The bracket when installed in a vehicle is attached to a window of the vehicle. The apparatus also comprises a body formed of a second material having a second thermal conductivity. The body is mounted on the bracket. The second thermal conductivity is greater than the first thermal conductivity. The housing when received in the bracket is in close proximity to the body. The body when the bracket is attached to the window of the vehicle contacts the window so as to transfer heat between the window and the housing, thereby modifying the temperature of the environment of the driver assist camera.

DETAILED DESCRIPTION

Figure 1:
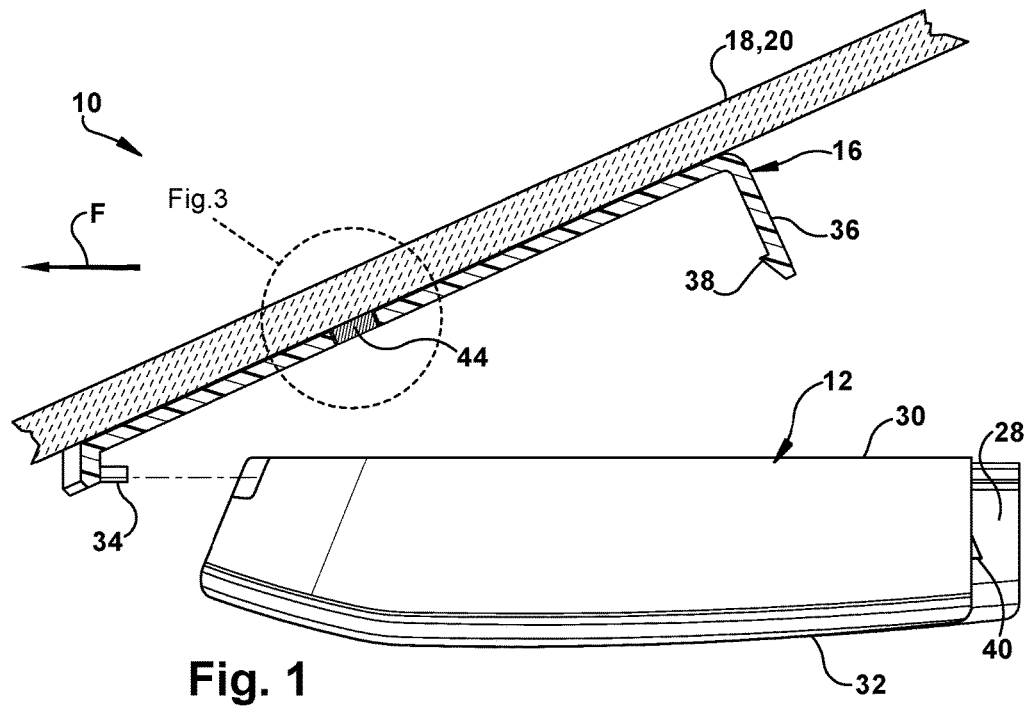
FIG. 1 is a schematic illustration of an apparatus in accordance with an example embodiment of the present invention.

FIG. 1 illustrates a system or apparatus 10 for moderating the environment around a DAS camera in accordance with an example embodiment of the present invention. The apparatus 10 includes a housing 12 that contains or supports a vision device 14 (FIG. 2), such as a CCD or CMOS camera. The apparatus 10 also includes a bracket 16 configured and dimensioned to receive and retain the housing 12.

Figure 3:
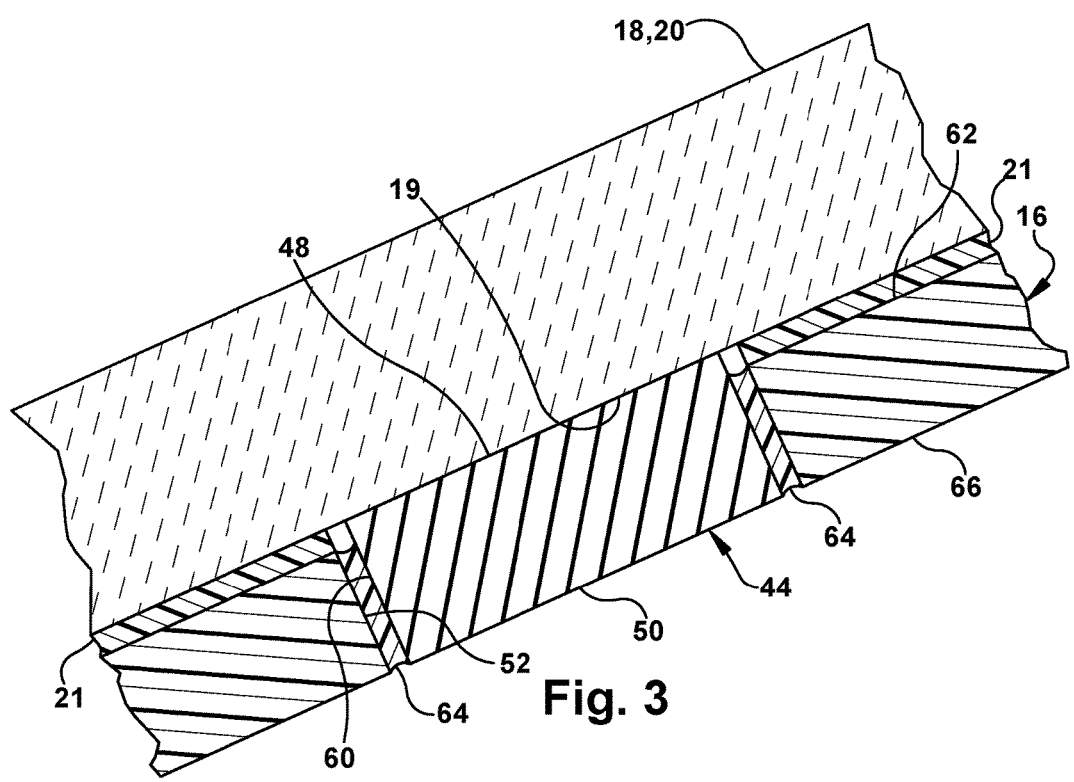
FIG. 3 is an enlarged view of a portion of the apparatus of FIG. 1.

As shown in FIG. 1, the bracket 16 is attached to a window 18 of a vehicle (not shown). More particularly, the bracket 16 is attached to a windscreen or windshield 20 of an automotive vehicle (not shown). The bracket 16 may be attached or secured to the windshield 20 via a layer of adhesive 21 (FIG. 3). The attachment or securement of the bracket 16 may be performed at the premises of the manufacturer of the windshield 20. Thus, when the windshield 20 is shipped or delivered to the manufacturer or assembler of the vehicle (not shown), the bracket 16 may already be attached to the windshield and ready to receive and retain the housing 12 with the vision device 14. The housing 12, which contains or supports the vision device 14, may then be installed or mounted in the bracket 16 after the windshield 20 is installed in the vehicle (not shown) on the assembly line of the vehicle manufacturer or assembler.

Figure 2:
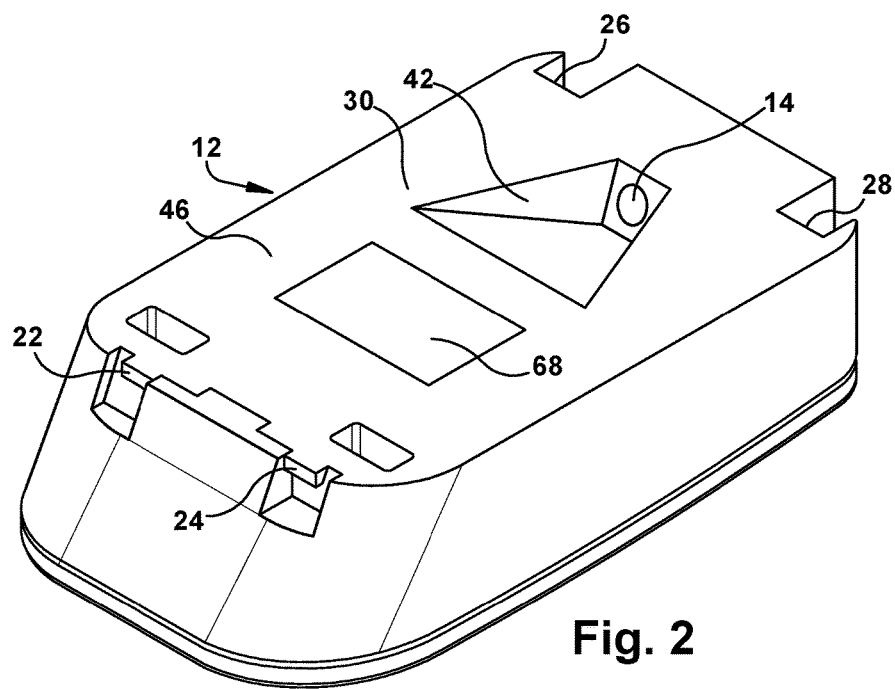
FIG. 2 is a perspective view of a camera housing included in the apparatus of FIG. 1.

The housing 12 may have any construction or configuration suitable to contain or support the vision device 14 and suitable to be received and retained in the bracket 16. As shown in FIGS. 1 and 2, the housing 12 has a generally rectangular configuration. At one end of the housing 12 are two laterally spaced apart tabs 22 and 24 that project away from the remainder of the housing along the length of the housing. At the opposite end of the housing 12 are two laterally spaced apart slots 26 and 28 that extend from an upper surface 30 (as viewed in FIG. 1) of the housing to a lower surface 32 (as viewed in FIG. 1) of the housing. The tabs 22 and 24 may be engaged by and retained in engagement with two complementarily shaped and laterally spaced apart hooks 34 (only one of which is shown in FIG. 1) formed at one longitudinal end of and in one piece with the bracket 16. The slots 26 and 28 receive two laterally spaced apart arms 36 (only one of which is shown in FIG. 1) formed at the opposite longitudinal end of and in one piece with the bracket 16. Each of the arms 36 includes a projection 38 that engages a corresponding projection 40 on the housing 12. The arms 36 are flexible and resilient so that the projection 38 may snap over the projection 40 and so that the arms may resiliently urge the tabs 22 and 24 into engagement with the hooks 34.

As shown in FIG. 2, a recess 42 is formed in the upper surface 30 of the housing 12 adjacent to the slots 26 and 28. The recess 42 is outwardly and upwardly angled in a direction away from the slots 26 and 28 and toward the tabs 22 and 24. The vision device 14 is contained or mounted in the housing 12 so that the vision device has a view outwardly and upwardly from a position adjacent to the slots 26 and 28. When the housing 12 is mounted in the bracket 16, the vision device 14 will have an unobstructed view through the windshield 20 toward the front of the vehicle (not shown), as indicated by the arrow F in FIG. 1.

Within the housing 12, in the space between the vision device 14 and the tabs 22 and 24 at the front or forward end of the housing, are various electronic components (not shown) for processing the information, in the form of electronic signals, obtained by the vision device. The electronic components (not shown) may be mounted on one or more printed circuit boards (not shown) contained within the housing 12. In operation, the vision device 14 and the electronic components will generate heat, which will need to be dissipated to avoid thermal damage to the electronic components and/or the vision device.

To facilitate dissipation of such heat, the bracket 16 mounts or carries a thermally conductive body 44. The thermally conductive body 44 may be received in a passage or opening 52 that extends through the bracket 16 from a first surface 62 to an opposed second surface 66 of the bracket. The upper surface of the thermally conductive body engages and presses against the windshield 20. When the housing 12 is pressed or snapped into the bracket 16, the portion 46 of the upper surface 30 of the housing 12 located between the vision device 14 and the tabs 22 and 24 will be pressed against a lower surface of the thermally conductive body 44. Heat will then be conducted from the housing 12 through the thermally conductive body 44 into the windshield 20, where the heat can be more readily dissipated by, for example, air flow over the windshield, which has a much larger surface area for heat dissipation than the thermally conductive body, the housing or the bracket 16. The environment of the vision device 14 may thus be cooled or moderated via the vehicle windshield 20.

The thermally conductive body 44 is made or formed of a material, such as a metal, with a thermal conductivity that is higher than the thermal conductivity of the material of which the bracket 16 is made or formed, which may be a plastic or polymer. By way of example, the bracket 16 may be formed of nylon 6/6, which has a thermal conductivity of about 0.25 watts per meter Kelvin, while the thermally conductive body 44 may be formed of carbon steel, which has a thermal conductivity of about 43 watts per meter Kelvin. Other materials may be used to form or make the bracket 16 and the thermally conductive body 44, as desired. The use of a plastic or polymer to make or form the bracket 16 results in a relatively strong and lightweight bracket with desirable flexibility and resilience. The use of a metal to make or form the thermally conductive body 44 results in a member with higher thermal conductivity and also greater weight per unit volume than a bracket 16 made or formed of plastic. Mounting a relatively small thermally conductive body 44 in a relatively larger bracket 16 provides desired thermal conductivity in a defined area without unduly increasing the total weight of the bracket and the thermally conductive body. As plastics generally have thermal conductivities less than 1.0 watt per meter Kelvin, metals generally have thermal conductivities substantially greater than 1.0 watt per meter Kelvin, and glass may have a thermal conductivity of about 1.0 watt per meter Kelvin, the thermally conductive body 44 may be fabricated of a material have a thermal conductivity equal to or greater than 1.0 watt per meter Kelvin.

The thermally conductive body 44 may have any convenient or desired shape, such as square or circular, with first and second opposed major side surfaces 48 and 50 (FIG. 3). The thermally conductive body 44 is mounted in the bracket 16 in an orientation such that when the bracket is attached to the windshield 20, the first major side surface 48 is presented toward the windshield and the opposed second major side surface 50 is presented away from the windshield. When the bracket is attached to the windshield 20, the first major side surface 48 of the thermally conductive body 44 contacts and presses against an interior side surface 19 of the windshield 20.

To help achieve a close contact between the first major side surface 48 of the thermally conductive body 44 and the interior side surface 19 of the windshield 20, the thermally conductive body 44 may be mounted or carried in the bracket 16 such that the first major side surface 48 is disposed at a position or in a plane higher than or outward of the position or plane of a generally parallel adjacent portion of the first surface 62 of the bracket 16, as can be seen in FIG. 3. In other words, the extent to which the thermally conductive body 44 projects or extends away from the adjacent portion of the first surface 62 of the bracket 16 is established or predetermined so as to ensure that the first major side surface 48 will be in close contact with the windshield 20 when the bracket 16 is attached to the windshield. The difference in the relative positions of the first major side surface 48 of the thermally conductive body 44 and the adjacent portion of the first surface 62 of the bracket 16 helps to ensure that the first major side surface contacts the interior side surface 19 of the windshield 20 before the adjacent portion of the first surface 62 of the bracket during the process of attaching or securing the bracket to the windshield. The difference in the relative positions of the first major side surface 48 of the thermally conductive body 44 and the adjacent portion of the first surface 62 of the bracket 16 also helps to ensure that the thickness of the adhesive layer 21 will not cause the first major side surface 48 to be held away from or spaced apart from the interior side surface 19 of the windshield 20.

To help achieve a close contact between the first major side surface 48 of the thermally conductive body 44 and the interior side surface 19 of the windshield 20 while also accommodating manufacturing tolerances, the thermally conductive body 44 may be mounted or carried in the bracket 16 using a narrow layer of an elastomeric material 64 interposed between and bonded or fixed to both the bracket and an outer periphery 60 of the thermally conductive body. Because the elastomeric material 64 is flexible, the thermally conductive body 44 will be permitted to move to a small extent relative to the bracket 16, in a downward direction as viewed in FIG. 3, as the bracket is attached to the windshield 20. At the same time, because the elastomeric material 64 is resilient, the thermally conductive body 44 will continue to be pressed against the interior side surface 19 of the windshield 20 as the bracket is attached to the windshield 20. As used in this application, the word "flexible" means that a material, such as the elastomeric material 64, is capable of being flexed, which is to say capable of being turned, bowed, or twisted without breaking. As used in this application, "resilient" means that a material, such as the elastomeric material 64, is capable of returning freely to a previous position, shape or condition, which is to say capable of recovering its size and shape after deformation.

As a further aid in achieving close contact between the first major side surface 48 of the thermally conductive body 44 and the interior side surface 19 of the windshield 20 to facilitate heat transfer from the thermally conductive body 44 to the windshield 20, the first major side surface 48 of the thermally conductive body 44 and the abutting or contacting portion of the interior side surface 19 of the windshield 20 may have complementary or substantially parallel surface contours. As depicted in FIG. 3, the first major side surface 48 of the thermally conductive body 44 and the abutting or contacting portion of the interior side surface 19 of the windshield 20 are substantially flat. In other words, the first major side surface 48 of the thermally conductive body 44 and the abutting or contacting portion of the interior side surface 19 of the windshield 20 have a degree of flatness or parallelism necessary to achieve effective and efficient heat transfer, subject to commercial cost constraints and manufacturing efficiency. Although substantially flat surfaces are depicted in FIG. 3, the first major side surface 48 of the thermally conductive body 44 and the abutting or contacting portion of the interior side surface 19 of the windshield 20 may have other complementary or parallel surface contours, as desired.

As the housing 12 is being mounted in the bracket 16, the portion 46 of the upper surface 30 of the housing 12 located between the vision device 14 and the tabs 22 and 24 will contact the second major side surface 50 of the thermally conductive body 44 and will press against the second major side surface. To help achieve close contact between the portion 46 of the upper surface 30 of the housing 12 and the second major side surface 50 of the thermally conductive body 44 to facilitate heat transfer from the housing 12 to the thermally conductive body 44, the second major side surface 50 may project or extend a small distance away from an adjacent portion of the second surface 66 of the bracket 16. In addition, the portion 46 of the upper surface 30 of the housing 12 and the second major side surface 50 of the thermally conductive body 44 may have complementary or substantially parallel surface contours. As depicted in FIG. 3, the portion 46 of the upper surface 30 of the housing 12 and the second major side surface 50 of the thermally conductive body 44 are substantially flat. In other words, the portion 46 of the upper surface 30 of the housing 12 and the second major side surface 50 of the thermally conductive body 44 have a degree of flatness or parallelism necessary to achieve effective and efficient heat transfer, subject to commercial cost constraints and manufacturing efficiency. Although substantially flat surfaces are depicted in FIG. 3, the portion 46 of the upper surface 30 of the housing 12 and the second major side surface 50 of the thermally conductive body 44 may have other complementary or parallel surface contours, as desired.

Further to facilitate heat transfer from the housing 12 to the thermally conductive body 44, an optional thermally conductive member 68 may be mounted on or carried by the portion 46 of the upper surface 30 of the housing 12, as shown in FIG. 2. The optional thermally conductive member 68 may have the same characteristics as the thermally conductive body 44 and may be mounted on or carried by the housing 12 in the same manner as the thermally conductive body 44 is mounted on or carried by the bracket 16. Accordingly, among other things, the thermally conductive member 68 may be made or formed of a material, such as a metal, with a thermal conductivity that is higher than the thermal conductivity of the material of which the housing 12 is made or formed, which may be a plastic or polymer. The thermally conductive member 68 may be mounted on or carried by the housing 12 such that a major side surface of the thermally conductive member is disposed at a position or in a plane higher than or outward of the position or plane of a generally parallel adjacent surface of the housing 12. The thermally conductive member 68 may also be mounted on or carried by the housing 12 using a narrow layer of an elastomeric material (not shown) interposed between and bonded or fixed to both the housing and an outer periphery of the thermally conductive member. Further, a major side surface of the thermally conductive member 68 and the abutting or contacting portion of the thermally conductive body 44 may have complementary or substantially parallel surface contours.

Although the system or apparatus 10 is described as being used to transfer heat from the housing 12 to the windshield 20 of a vehicle (not shown), the apparatus may also potentially be used to transfer heat from the windshield to the housing. Such heat transfer may potentially be useful in a situation in which the vehicle (not shown) has a relatively low interior temperature, but the atmospheric environment outside of the vehicle is sunny, thus heating the windshield more quickly than the interior of the vehicle in which the apparatus is mounted.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to manage a temperature of an environment of a driver assist camera of a vehicle comprising:
   a housing in which the driver assist camera is mountable;
   a member mounted on the housing;
   an elastomeric material interposed between the member and the housing that mounts the member on the housing;
   a bracket configured and dimensioned to receive and retain the housing, the bracket being formed of a first material having a first thermal conductivity, the bracket when installed in a vehicle being attached to a window of the vehicle; and
   a body formed of a second material having a second thermal conductivity, the body being mounted on the bracket and being received in an opening extending through the bracket from a first surface of the bracket to an opposed second surface of the bracket, the second thermal conductivity being greater than the first thermal conductivity;
   the housing when received in the bracket being in close proximity to the body, the body when the bracket is attached to the window of the vehicle contacting the window so as to transfer heat between the window and the housing, the member when the housing is received in the bracket contacting the body so as to transfer heat between the window and housing via the member and the body, thereby modifying the temperature of the environment of the driver assist camera.

2. The apparatus of claim 1 wherein the housing when received in the bracket is in contact with the body.

3. The apparatus of claim 1 wherein the second material has a thermal conductivity of at least 1 watt per meter per Kelvin.

4. The apparatus of claim 1 wherein the first material is a polymer and the second material is a metal.

5. The apparatus of claim 1 comprising an elastomeric material interposed between the body and the bracket that mounts the body on the bracket.

6. The apparatus of claim 1 wherein a side surface of the body is disposed in a first plane that is outward of a second plane in which the first surface of the bracket is disposed.

7. The apparatus of claim 1 wherein a side surface of the member is disposed in a first plane that is outward of a second plane in which a parallel adjacent surface of the housing is disposed.

* * * * *